United States Patent
Van Horn et al.

(10) Patent No.: US 7,263,498 B1
(45) Date of Patent: Aug. 28, 2007

(54) ATTAINING PRODUCT INVENTORY GROUPINGS FOR SALES IN A GROUP-BUYING ENVIRONMENT

(75) Inventors: Tom Van Horn, Bellevue, WA (US); Richard V Halbert, Redmond, WA (US); Linda S Perkins, Issaquah, WA (US)

(73) Assignee: Vulcan Portals, Inc., Seattle, WA (US)

( * ) Notice: Subject to any disclaimer, the term of this patent is extended or adjusted under 35 U.S.C. 154(b) by 740 days.

(21) Appl. No.: 09/863,801

(22) Filed: May 22, 2001

Related U.S. Application Data

(60) Provisional application No. 60/206,566, filed on May 23, 2000.

(51) Int. Cl.
*G06Q 30/00* (2006.01)
(52) U.S. Cl. .............................. 705/26; 705/27; 705/28
(58) Field of Classification Search .................. 705/26, 705/27, 28
See application file for complete search history.

(56) References Cited

U.S. PATENT DOCUMENTS

| | | | |
|---|---|---|---|
| 3,581,072 A | 5/1971 | Nymeyer | |
| 4,567,359 A | 1/1986 | Lockwood | |
| 4,789,928 A | 12/1988 | Fujisaki | |
| 5,148,365 A | 9/1992 | Dembo | |
| 5,255,184 A | 10/1993 | Hornick et al. | |
| 5,270,921 A | 12/1993 | Hornick | |
| 5,377,095 A | 12/1994 | Maeda et al. | |
| 5,394,324 A | 2/1995 | Clearwater | |
| 5,576,951 A | 11/1996 | Lockwood | |
| 5,640,569 A | 6/1997 | Miller et al. | |
| 5,712,985 A | 1/1998 | Lee et al. | |
| 5,724,521 A | 3/1998 | Dedrick | |
| 5,727,165 A | 3/1998 | Ordish et al. | |
| 5,729,700 A | 3/1998 | Melnikoff | |
| 5,745,882 A | 4/1998 | Bixler et al. | |
| 5,758,327 A | 5/1998 | Gardner et al. | |
| 5,758,328 A | 5/1998 | Giovannoli | |
| 5,765,143 A | 6/1998 | Sheldon et al. | |
| 5,794,207 A | 8/1998 | Walker et al. | |
| 5,794,219 A | 8/1998 | Brown | |
| 5,797,127 A | 8/1998 | Walker et al. | |

(Continued)

FOREIGN PATENT DOCUMENTS

WO    WO 00/11570    3/2000

(Continued)

OTHER PUBLICATIONS

Restatement of the Law, Second; Contacts 2d; The American Law Institute, 1981, pp. 73-75.*

(Continued)

*Primary Examiner*—Elaine Gort
(74) *Attorney, Agent, or Firm*—Fenwick & West LLP

(57) ABSTRACT

A method and system are provided that enables a seller to reserve from a supplier a grouping of products (e.g., create a virtual inventory) for sale in an on-line group-buying sale. The supplier agrees to reserve an agreed quantity for an agreed time period. The seller conducts the group-buying sale offering the reserved product inventory to buyers. The seller and supplier then follow agreed upon procedures for shipping the products.

26 Claims, 5 Drawing Sheets

U.S. PATENT DOCUMENTS

| | | |
|---|---|---|
| 5,799,284 A | 8/1998 | Bourquin |
| 5,806,047 A | 9/1998 | Hackel et al. |
| 5,809,144 A | 9/1998 | Sirbu et al. |
| 5,818,914 A | 10/1998 | Fujisaki |
| 5,826,244 A | 10/1998 | Huberman |
| 5,832,459 A | 11/1998 | Cameron et al. |
| 5,835,896 A | 11/1998 | Fisher et al. |
| 5,842,178 A | 11/1998 | Giovannoli |
| 5,845,265 A | 12/1998 | Woolston |
| 5,845,266 A | 12/1998 | Lupien et al. |
| 5,873,069 A | 2/1999 | Reuhl et al. |
| 5,890,137 A | 3/1999 | Koreeda |
| 5,890,138 A | 3/1999 | Godin et al. |
| 5,895,454 A | 4/1999 | Harrington |
| 5,897,639 A | 4/1999 | Greef et al. |
| 5,905,975 A | 5/1999 | Ausubel |
| 5,913,210 A | 6/1999 | Call |
| 5,915,209 A | 6/1999 | Lawrence |
| 5,950,176 A | 9/1999 | Keiser et al. |
| 5,956,709 A | 9/1999 | Xue |
| 5,983,199 A | 11/1999 | Kaneko |
| 5,999,914 A | 12/1999 | Blinn et al. |
| 6,014,644 A | 1/2000 | Erickson |
| 6,021,398 A | 2/2000 | Ausubel |
| 6,026,383 A | 2/2000 | Ausubel |
| 6,032,125 A | 2/2000 | Ando |
| 6,035,288 A | 3/2000 | Solomon |
| 6,041,308 A | 3/2000 | Walker et al. |
| 6,049,774 A | 4/2000 | Roy |
| 6,055,504 A | 4/2000 | Chou et al. |
| 6,067,528 A | 5/2000 | Breed et al. |
| 6,076,070 A | 6/2000 | Stack |
| 6,081,789 A | 6/2000 | Purcell |
| 6,085,169 A | 7/2000 | Walker et al. |
| 6,101,484 A | 8/2000 | Halbert et al. |
| 6,112,189 A | 8/2000 | Rickard et al. |
| 6,119,101 A | 9/2000 | Peckover |
| 6,141,653 A | 10/2000 | Conklin et al. |
| 6,141,666 A | 10/2000 | Tobin |
| 6,260,024 B1 | 7/2001 | Shkedy |
| 6,269,343 B1 | 7/2001 | Pallakoff et al. |
| 6,324,522 B2 * | 11/2001 | Peterson et al. .............. 705/28 |
| 6,332,129 B1 | 12/2001 | Walker et al. |
| 6,418,415 B1 | 7/2002 | Walker et al. |
| 6,473,740 B2 | 10/2002 | Cockrill et al. |
| 6,516,302 B1 | 2/2003 | Deaton et al. |
| 6,631,356 B1 | 10/2003 | Van Horn et al. |

FOREIGN PATENT DOCUMENTS

| | | |
|---|---|---|
| WO | WO 00/30004 | 5/2000 |
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/43928 | 7/2000 |
| WO | WO 00/43929 | 7/2000 |
| WO | WO 00/43938 | 7/2000 |
| WO | WO 00/45318 | 8/2000 |
| WO | WO 00/48104 | 8/2000 |
| WO | WO 00/59224 | 10/2000 |
| WO | WO 01/02992 A2 | 1/2001 |

OTHER PUBLICATIONS

Burneatas, Apostolos; Option Contacts in Supply Chains; May 2000.*

Delft; A Practical Implementation of Stochastic Programming: an Applicationto the Evaluation of Option Contracts in Supply Chains; Oct. 2002.*

Lovejoy, W.S.; Quantity Flexibility Contracts and Supply Chain Performance; Manufacturing and Service Operations Management; vol. 1, No. 2, 1999, pp. 89-111.*

U.S. Appl. No. 09/348,812, filed Mar. 6, 2000, Reddi.

U.S. Appl. No. 09/250,039, filed Apr. 7, 2000, Grossman et al.

U.S. Appl. No. 09/249,727, filed Feb. 13, 1999, Ehrlich.

U.S. Appl. No. 60/116,729, filed Jan. 22, 1999, Reddi.

U.S. Appl. No. 60/118,189, filed Feb. 1, 1999, Ehrlich et al.

U.S. Appl. No. 60/097,932, filed Aug. 21, 1998, Pallakoff et al.

U.S. Appl. No. 60/097,933, filed Sep. 28, 1998 Pallakoff et al.

An Exploratory Study of the Emerging Role of Electronic Intermediaries, by Joseph B. Bailey and Yannis Bakos, International Journal of Electronic Commerce, vol. 1, No. 3, Spring 1997, pp. 7-20. (Document submitted includes Abstract and pp. numbered 1-14).

Search Report dated Sep. 8, 1999, for U.S. Appl. No. 09/281,859.

Internet World (Mecklemedia), Cliff Figallo, "Hosting Web Communities," Building Relationships, Increasing Customer Loyalty, and Maintaining a Competitive Edge. Published by John Wiley & Sons, Inc, Copyright 1998.

Online document from Savvio.com, "Savvio.com: Our Story," wysiwyg://8/http://savvio.com/about/aboutUS.jsp, Printed Sep. 28, 2000.

"Retail Federation Group Buying Set," HDF-The Weekly Home Furnishings Newspaper, v0, n0, p. 9, Dec. 26, 1994.

"Frontier Rings Up a Sale with National Retail Federation," PR Newswire, p. 119NY9M057, Jan. 19, 1998.

"NRF: home page of World Wide Web (National Foundation Launches Site)," The Weekly Newspaper for the Home Furnishings Network, v70, n42, p. 10(1), Oct. 14, 1996.

"KMART" Targets GE as EDI Provider Signals GE's Re-Commitment to EDI, EDI News, v11, n21, Oct. 13, 1997.

"National Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets," PIC Proceedings of the 21$^{st}$ 1999 IEEE International Conference, p. 71-76, May 16-21, 1999, Cat #CH36351, 1999.

DIALOG (R) File, The Gale Group, "Mosher" vies ARA as survival kit for small specialty stores, Daily News Record, v24, n22, p. 4(1) Feb. 2, 1994.

Hagel III et al., "The new infomediaries," The McKinsey Quarterly, 1997 No. 4, pp. 54-71.

Online Document from Agorics, Inc., http://www.agoricscom/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities-Auctioned Off," "Collusion in Auctions," "Auction Bibliography," Dated 1996, Reprinted Oct. 25, 1999.

U.S. Appl. No. 09/348,812, filed Mar. 6, 2000, Reddi.

U.S. Appl. No. 09/250,039, filed Apr. 7, 2000, Grossman et al.

U.S. Appl. No. 09/249,727, filed Feb. 13, 1999, Ehrlich.

U.S. Appl. No. 60/116,729, filed Jan. 22, 1999, Reddi.

U.S. Appl. No. 60/118,189, filed Feb. 1, 1999, Ehrlich et al.

U.S. Appl. No. 60/097,932, filed Aug. 21, 1998, Pallakoff et al.

U.S. Appl. No. 60/097,933, filed Sep. 28, 1998, Pallakoff et al.

US 6,000,826, 12/1999, Parunak et al. (withdrawn)

* cited by examiner

ATTAINING PRODUCT INVENTORY GROUPINGS FOR SALES IN A GROUP-BUYING ENVIRONMENT

CROSS REFERENCE TO RELATED APPLICATIONS

This application claims priority under 35 USC § 119(e) from Provisional Application Ser. No. 60/206,566, entitled "System and Method for Attaining Product Inventory Groupings for Sales in a Group-Buying Environment," filed on May 23, 2000, which is incorporated by reference herein. This application is also related to U.S. Pat. No. 6,101,484, "Dynamic Market Equilibrium Management System, Process and Article of Manufacture," which issued on Aug. 8, 2000; U.S. application Ser. No. 09/270,219, "Demand Aggregation Through Online Buying Groups," filed on Mar. 15, 1999; U.S. application Ser. No. 09/409,237, "System and Method for Extension of Group Buying Throughout the Internet," filed on Sep. 30, 1999, and U.S. application Ser. No. 09/596,921, "System and Method for Enhancing Buyer and Seller Interactions During a Group-Buying Sale," filed on Jun. 19, 2000, the disclosures of which are incorporated herein by this reference.

COPYRIGHT NOTICE

A portion of the disclosure of this patent document contains material, which is subject to copyright protection. The copyright owner has no objection to the facsimile reproduction of the patent document or the patent disclosure, as it appears in the Patent and Trademark Office patent file or records, but otherwise reserves all copyright rights whatsoever.

1. FIELD OF INVENTION

The present invention relates to methods and systems that support group-buying sales methods and systems conducted over electronic networks, such as the Internet. In particular, embodiments of the invention allow sellers to reserve product inventory groupings for use in an on-line group-buying sale that aggregates buyer demand.

2. BACKGROUND OF THE INVENTION

As shown in FIG. 1, a store 100 is simply a collection of products 120. As shown in FIG. 2, a mall 140, of course, is a collection of stores 100. Historically, consumers 160 could visit the store 100 or the mall (i.e., a bazaar) to haggle with sellers over prices and to share information about products with other consumers (e.g., buyers) and the sellers (sometimes as a technique for demanding a lower price). In the modern era, the consumers 160 have typically had to come to the seller's pre-selected and pre-priced collection of products 120 in order to make a purchase.

An on-line group-buying sale 380, such as that represented in FIG. 3, may turn the point of sale from a collection of products 120 into a collection of consumers 160. The on-line group-buying sale 380 may further allow the consumers 160 to be located among any number of other buying groups in an electronic network (e.g., an Internet site provided by a business entity implementing an on-line group-buying sale). This fundamental shift in structure may provide advantages to both buyers and sellers, some of which an interested reader may find discussed in a related pending, commonly owned application filed on Mar. 15, 1999, entitled "Demand Aggregation Through Online Buying Groups," U.S. application Ser. No. 09/270,219, and in its corresponding PCT publication WO00/55782 (PCT/US00/03814), the disclosures of which are hereby incorporated by reference.

By globally aggregating a large number of consumers 160 in one place at one time (a buying group), the on-line group-buying sale 380 may realize a shift in power from the seller of goods and services to the buyers of goods and services. Rather than having the product's seller declare a single static sales price, the on-line group-buying sale 380 may permit each buyer to establish a maximum price at which he or she is willing to purchase the product/service.

Unfortunately, the on-line group-buying sale 380 may not attain its full potential, in some instances, if the seller must purchase and maintain a product inventory prior to initiating an on-line group-buying sale for a given featured item (e.g., a product and/or and service). Inventory maintenance and the uncertainty associated with selling all of a given product in inventory may increase the seller's costs, which are typically passed on to the buyers. In addition, some sellers may be reluctant to host on-line group-buying sales for some featured items if the seller is additionally required to purchase and warehouse a sufficiently large inventory of the featured items prior to the sale's commencement. Sellers may not generally rely upon suppliers (e.g., manufacturers, wholesalers, etc.) to retain a large quantity of a given product on hand, especially if the supplier is continuously depleting inventory due to ongoing shipments associated with other sales.

SUMMARY OF THE INVENTION

Embodiments of the invention may enable a seller to reserve from a supplier a grouping of featured items (e.g., products/services) for sale in an on-line group-buying sale. The supplier agrees to reserve an agreed upon quantity of featured items for an agreed time period. The seller conducts the on-line group-buying sale of the reserved featured item inventory (e.g., the seller's virtual inventory) to one or more buyers. The seller and supplier may then follow agreed upon procedures for shipping the featured items to the buyers.

Embodiments of the invention source a featured item for an on-line group-buying sale. A seller communicates to a supplier a featured item quantity and a featured item time reservation. The seller receives the supplier's consent to reserve the featured item quantity for the featured item time reservation. After conducting one or more on-line group-buying sales of the featured item quantity during the featured item time reservation to one or more buyers, the seller may send shipment instructions to the supplier regarding a number of featured items sold.

Embodiments of the invention further provide for sourcing a featured item for an on-line group-buying sale. A supplier may receive from a seller a featured item quantity, a featured item time reservation, and product sourcing instructions. The product sourcing instructions may state that the supplier is bound contractually to retain the featured item quantity for the featured item time reservation. The supplier may negotiate with the seller to determine a negotiated featured item quantity and a negotiated featured item time reservation. The supplier may execute a binding agreement with the seller regarding the negotiated featured item quantity and the negotiated featured item time reservation. The binding agreement may require retention of the negotiated featured item quantity for the negotiated featured item time reservation. The supplier may receive shipment instructions from the seller regarding a number of featured items sold during the on-line group-buying sale.

Embodiments of the invention also provide a computing system configured for sourcing a featured item for an on-line group-buying sale. The computing system may comprise a supplier communications module configured to send a supplier a featured item quantity, a featured item time reservation, and product sourcing instructions. The product sourcing instructions may state that the supplier is bound contractually to retain the featured item quantity for the featured item time reservation. The computing system may also include a virtual inventory module configured to receive the supplier's consent to the product sourcing instructions for a negotiated featured item quantity and a negotiated featured item time reservation and also configured to receive a binding agreement from the supplier regarding the negotiated featured item quantity and the negotiated featured item time reservation. The binding agreement may require the supplier to retain the negotiated featured item quantity for the negotiated featured item time reservation.

BRIEF DESCRIPTION OF THE DRAWINGS

An embodiment of the invention will be described below relative to the following figures.

DETAILED DESCRIPTION OF AN EMBODIMENT OF THE INVENTION

Figure 1:
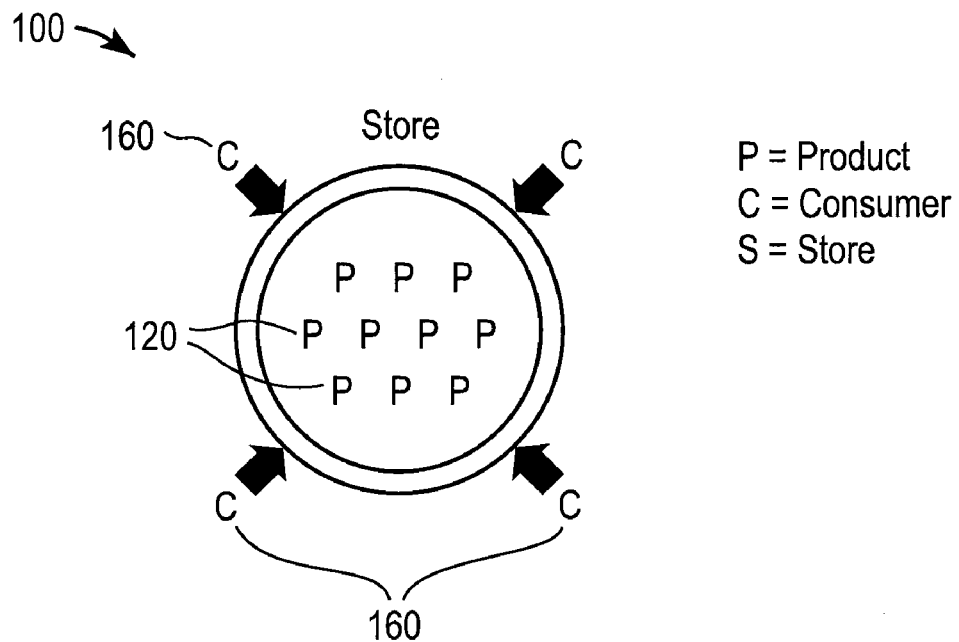
FIGS. 1 and 2 are simplified diagrammatic representations of prior art sales models useful for understanding the invention.
Figure 2:
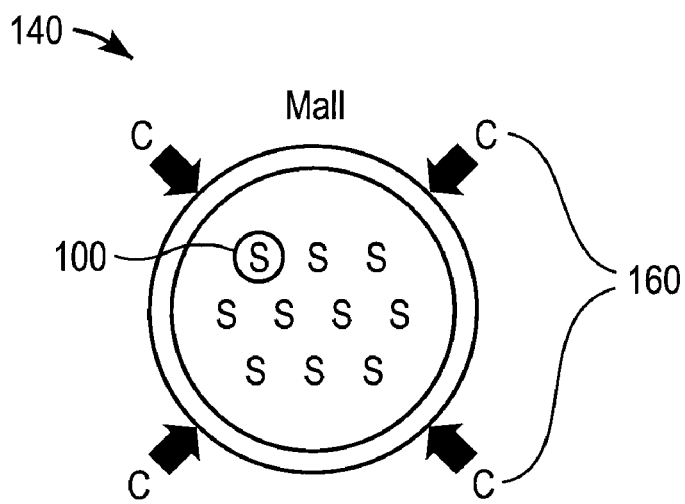
Figure 3:
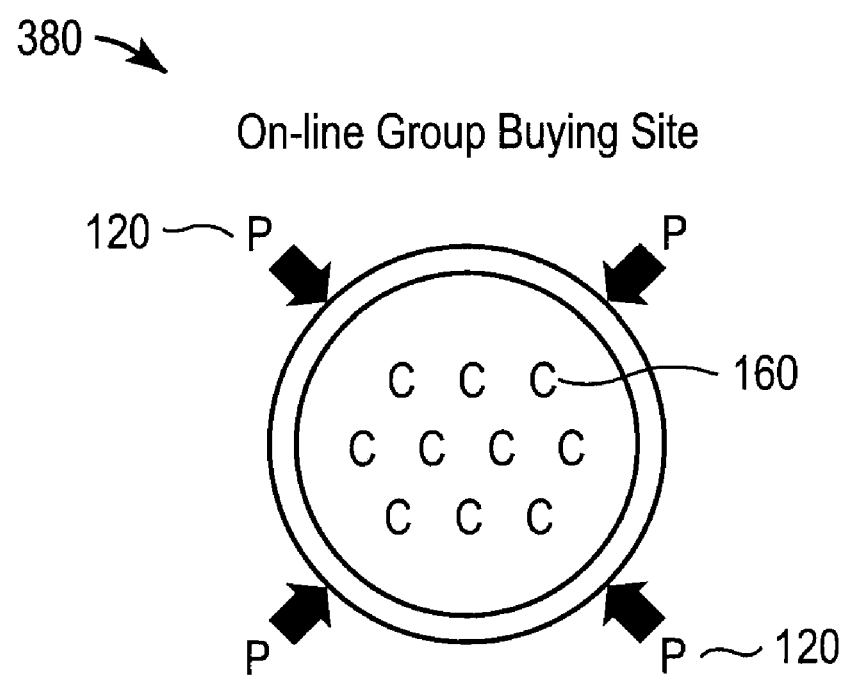
FIG. 3 is a corresponding simplified diagrammatic representation of an on-line group-buying sale in accordance with an embodiment of the invention.

Embodiments of the invention may make an on-line group-buying sale more effective by providing sellers with a capability for sourcing featured items for such sales, thus providing the sellers with a virtual featured item inventory. A seller typically determines a quantity of the featured item to request for the on-line group-buying sale and also determines a time duration that the quantity may be needed for the sale, according to an embodiment of the invention. The seller communicates to a supplier the quantity of featured items, the time duration, and product sourcing instructions. The product sourcing instructions typically require that the supplier agree to be bound contractually to retain the featured item quantity for the specific time duration. Of course, the seller may also communicate a desired price for the featured items as well. The seller and supplier may negotiate with each other to determine a negotiated featured item quantity and a negotiated featured item time duration. The seller receives the supplier's consent to the product sourcing instructions and enters into a binding agreement with the supplier regarding the quantity and the time duration for the featured item, whereby the binding agreement creates a product inventory grouping for the featured item. The seller conducts the on-line group-buying sale for the featured item using the virtual inventory reserved from the supplier. The seller may conduct one or more on-line group-buying sales using the virtual inventory during the negotiated featured item time duration. The seller may subsequently send instructions to the supplier regarding the amount of featured items sold and may also identify the buyers to receive the featured items so that the supplier can directly ship the purchased featured items to the buyers.

Embodiments of the invention may free sellers from maintaining inventories for at least some, if not all, of the featured items, that they plan to sell in on-line group-buying sales. Some sellers may find the freedom from maintaining product inventories and/or executing binding commitments to purchase given featured items sufficiently attractive to motivate them to conduct on-line group-buying sales and/or may motivate sellers to provide featured items for on-line group-buying sales that they would otherwise not provide. Accordingly, buyers may benefit from an increased number of on-line group-buying sales, and/or from the presence of new featured items in on-line group-buying sales, and/or lower prices for featured items.

Suppliers may also enjoy simplified featured item shipment procedures, according to embodiments of the invention. For example, a supplier may retrieve all the featured items from an on-line group-buying sale from its warehouse for shipment to buyers at once instead of the conventional procedure in which the supplier retrieves products on a per-buyer basis for individual shipment to particular buyers. Suppliers may also enjoy increased profits and reduced insurance costs due to processing large quantities of products through its warehousing facilities in a relatively short period of time.

Definitions

The following definitions are provided to assist the reader in understanding the invention described herein. The scope of the invention is not limited by these definitions but only by the claims.

Buyer—an entity that participates in an on-line group-buying sale. Buyers may comprise humans and/or robotic devices configured to participate in an on-line group-buying sale.

Electronic Network—an electronic communication medium across which sellers, suppliers, and/or buyers may communicate. Representative electronic networks include the Internet, intranets, the public switched telephone network ("PSTN"), wireless networks, and television networks, such as satellite, broadcast, and cable. Electronic networks further include hybrid systems, such as those in which sellers communicate to buyers via one medium, such as cable television, and buyers communicate to sellers via another medium, such as the Internet. Electronic networks additionally include aggregated electronic networks, such as when buyers communicate to sellers via multiple media, such the Internet, the telephone, and cable television.

Featured Item—a product or service, or groups of products and services, offered for sale in an on-line group-buying sale. Products and services may also include product/service variants.

Group Product Sourcing—locating, reserving, creating, and/or obtaining a collection of featured items for an on-line group-buying sale. Group product sourcing may provide an inventory of featured items for an on-line group-buying sale. In some instances, the inventory may comprise a "virtual inventory" in the sense that the seller need not actually retain and/or own the featured items to be sold in an on-line group-buying sale but the seller may generally regard the featured items as elements in its own inventory, at least for a given time period.

On-line Group-Buying Mechanism—an apparatus (software and/or hardware) configured to conduct an on-line group-buying sale. The apparatus may be configured for operation on a computerized system configured to transmit and receive data across an electronic network. The apparatus may be accessible from a variety of entry points on the electronic network, such as a seller site.

On-line Group-Buying Sale—a method of selling featured items to buyers in which the price paid by each buyer for the featured items is a function of the aggregated demand of a group of buyers. The method includes both buyer-driven and seller-driven methods. In a buyer-driven method, individual buyers submit binding offers for featured items at a specific price. In a seller-drive method, the seller provides one or more offers contingent upon aggregated buyer demand achieving a particular amount. The method further includes variations in which the characteristics of a sale are both static and dynamic, e.g., whether the sale characteristics may be modified once the sale begins. An ordinary artisan will recognize that modifications may be made to the precise form of the on-line group-buying sales described herein while still retaining the essential characteristics of such sales.

PowerBuy—a specific type of on-line group-buying sale in which buyers wishing to purchase a particular featured item within a given time frame join forces in a buying group (e.g., a "co-op") formed across an electronic network specifically to accomplish the desired purchase. The buying group typically enables its individual buyers to leverage their combined purchasing power to achieve an economic bargain superior to that attainable by any one buyer acting alone. This superior bargain most often will be reflected in terms of a lower price. For example, as more buyers join the buying group, the desired item's price typically declines. At the end of the purchase period, all buyers purchase the item at a final (low) price even if some buyers have submitted binding offers at higher prices. A PowerBuy represents a preferred on-line group-buying sale, although PowerBuys and their variants represent merely one type of on-line group buying sale.

Product Inventory Grouping—A collection of featured items, such as products and services, reserved by a seller from a third party, such as a supplier, that is available for sale to buyers in an on-line group-buying sale. The third party is typically obliged to maintain the product grouping in reserve until released by the seller. The third party may also be responsible for shipping the products to individual buyers. In some embodiments, the seller may provide the supplier some consideration (e.g., a reservation payment) for the seller's agreement to reserve groups of inventory pending completion of related group sales. A product inventory grouping need not necessarily comprise a quantity of a single featured item but may also comprise a collection of different products or services, as well as combinations of products and services. The product inventory group may essentially provide the seller with a "virtual inventory."

Seller—a manufacturer, retailer, or other party offering products/services for sale to buyers via an on-line group-buying sale.

Seller's Site—a computer-enabled location, such as a website, on which the on-line group-buying mechanism resides and/or a location that provides its functionality. An ordinary artisan will recognize that such a location may merely provide a virtual presence, with a substantial portion of the actual computing power driving the on-line group-buying mechanism located elsewhere. For example, third-party operated locations, such as websites, within an electronic network, such as the Internet, may be been configured to display one or more on-line group-buying sales. The universe of such partner sites potentially could encompass an entire electronic network. For purposes of at least one embodiment of the invention, the location is one in which the PowerBuy method of sale is practiced in accordance with the commonly assigned applications referred to herein.

Supplier—The supplier may be any entity having a quantity of featured items (e.g., products/services) available for reservation or purchase by a seller. By way of example only, the supplier may be a wholesaler, a distributor, and/or the product's manufacturer.

Introductory Description of an On-Line Group-Buying Mechanism

Embodiments of the invention described herein operate in conjunction with an on-line group-buying mechanism that typically provides buyers and sellers with an improved method and system for communicating product and sales information. An on-line group-buying mechanism typically provides the technical support needed for hosting an on-line group-buying sale. As discussed above, on-line group-buying sales may have a variety of types. For example, some on-line group-buying sales are buyer-driven in the sense that featured item prices are typically lowered on the basis of binding offers submitted by buyers while seller-driven on-line group-buying sales typically lower prices on the basis of received buyer offers achieving a pricing point previously announced by the seller. Furthermore, some on-line group-buying sales are static while others are dynamic, e.g., whether the sale's characteristics can be modified once the sale has begun.

In a typical on-line group-buying mechanism, a buying group for a featured item, such as a given product or product variant, may be defined by placing onto an e-commerce server a set of data that describes the buying group in terms of its price curve(s), the featured item, the time interval during which the buying group is available, and any minimum and maximum quantities available. Some of these defining properties of a buying group may not necessarily be revealed to potential buyers.

The definition of a buying group, including its price curve, may be subject to modification during its lifetime. In fact, the ability to modify the buying group definition based on data gathered from offers to participate in a buying group is an important aspect of some on-line group-buying sales, such as the preferred PowerBuy sale procedure. Merchandising and yield management personnel may define each buying group by means of data entry. Obviously, such data entry/data modification need not be limited to the time prior to the opening of a buying group.

When the buying group is active, buyers submit their offers to the buying group, indicating a maximum price at which they will commit to purchasing the featured item. This may be at the current price, or it may be below the current price, for example. Once the current price is justified by the volume of buying group offers, all offers within a specified range below the current price may trigger a new, lower current price for the merchandise, according to a preferred on-line group-buying sale.

In general, buyer offers at the current price guarantee availability of the amount of the featured item specified in the offer, provided that the amount does not exceed the difference between the current number of similarly committed units and any maximum number of units available. Note that the starting price may be established when the buying group is announced, before any offers have been submitted based on the price curve and/or other merchandising data. Such a starting price may be based on a minimum number of units that must be ordered for the buying group to qualify for that price.

A buyer may place a contingency on his binding offer based on price, according to some embodiments of on-line group-buying sales. Specifically, should the buyer indicate that he does not find the current price acceptable, but nevertheless wishes to buy the featured item at a lower price, his offer is made contingent upon the buying group reaching the lower price. As more offers are made, and the current price may drop to a level at or below the contingent price specified by the buyer, upon which the contingency based on price may be removed. Offers may typically be increased up to the current price at any time during the buying group should buyers wish to improve their chance of success or ensure availability of the featured item. However, offers may not typically be cancelled nor may buyers reduce their offered price, i.e., buyer offers are binding on the buyer.

Regardless of the maximum price specified within each purchase offer, all members of the buying group may receive the benefit of the lowest final price, according to a preferred on-line group-buying sale. In addition to seeing the current price go down, the buyers may also be given an indication of how many more participants it may take to get the price down to a specified amount in some embodiments of on-line group-buying sales. A buyer may be permitted to initiate electronic communications, such as e-mail messages, designed to increase buyer volume, thereby further reducing the price available to all buyers.

Once a buying group is closed, either because the prescribed time limit is met, or any maximum number of available items is sold, all offers at or above the closing price are typically accepted and final sales information is communicated to other processes, which may handle the order fulfillment via conventional means of hard and digital goods transportation. Buyers who made successful offers are notified of acceptance and merchandise shipment, and those buyers whose offers were not successful are typically notified of the result.

Buying groups may be accessed through more locations than just a seller's site. Buying groups may also be accessed from various partner sites as well, e.g., locations having a link to the seller's site. In conjunction with partner sites, a display may show an on-line group-buying sale featured item on the partner site, such as by way of a link to pages on the seller's site.

Exemplary on-line group-buying mechanisms and on-line group-buying sales are described in the issued patent and applications cross-referenced above. The foregoing discussion and the related applications incorporated by reference describe various possible on-line group-buying mechanisms and on-line group-buying sales. Most formats for on-line group-buying sales and on-line group-buying mechanisms employ demand aggregation of various buyers as a technique for reducing the price of the offered goods and services. Accordingly, many more forms of on-line group-buying sales may be appropriate for use in conjunction with the present invention than those described in the applications incorporated herein.

Description of an Exemplary Group Product Sourcing Procedure

Figure 4:
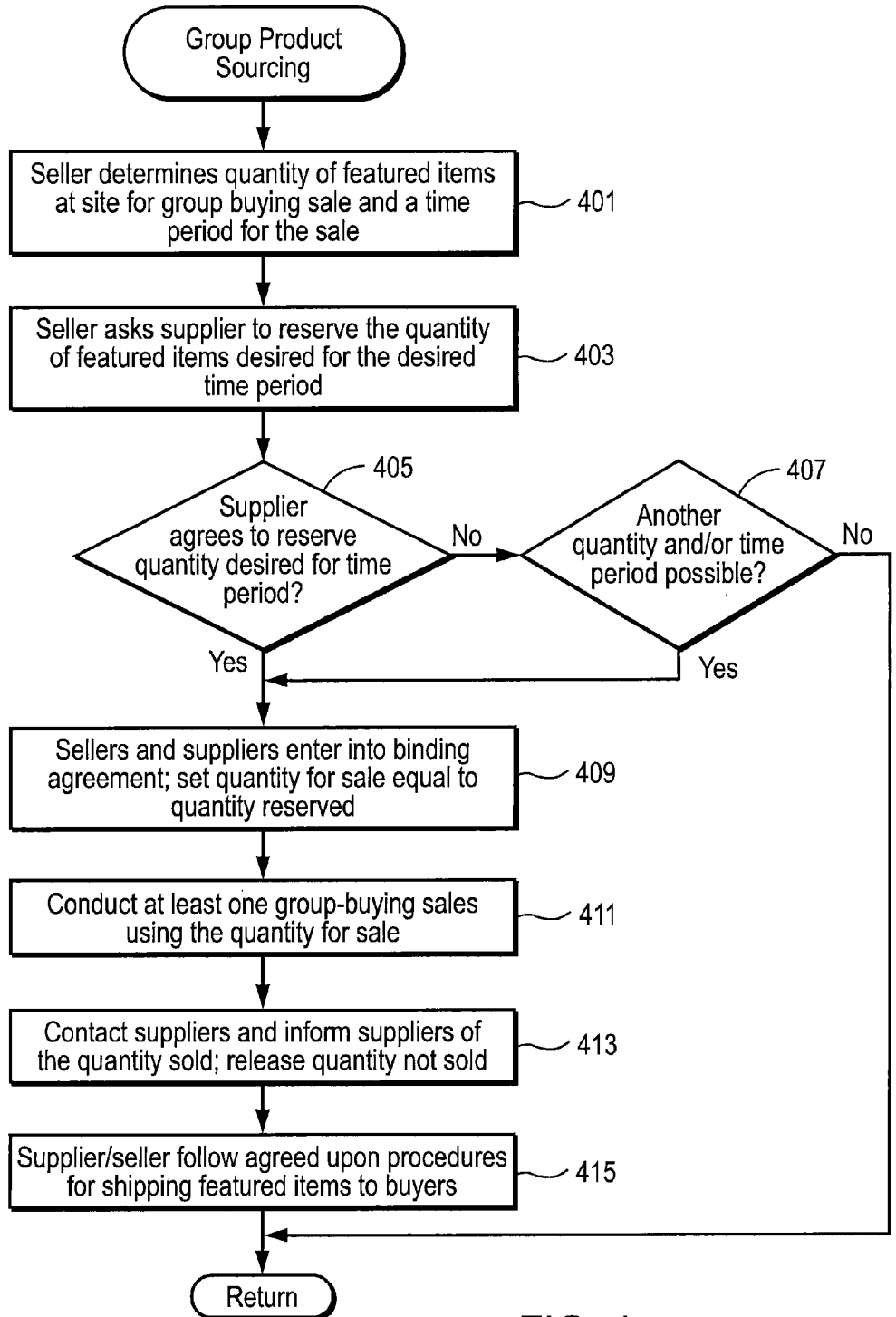
FIG. 4 is a flowchart describing a sample group product sourcing procedure, according to an embodiment of the invention.

FIG. 4 is a flowchart describing a group product sourcing procedure, according to an embodiment of the invention. As previously discussed, the group product sourcing procedure aims to provide the seller with a virtual inventory of featured items, e.g., a collection of featured items that the seller may regard as being part of its inventory for at least a given time period by virtue of a binding reservation agreement with a supplier.

A seller determines the quantity of a featured item for an on-line group-buying sale and a period of time during which the group-buying sale will be conducted (step 401). For example, the seller may determine that it will conduct three separate group-buying sales over a five-day period and that each individual group-buying sale will comprise 150 widgets, for a total of 450 widgets (3×150). The seller may base this determination upon a number of factors, such as data from previous on-line group-buying sales of similar featured items.

The seller asks a supplier to reserve the quantity of featured items desired for the group-buying sale for a desired amount of time (step 403). The seller may also communicate information such as the price that the seller is willing to pay for the featured items sold. The seller and supplier may communicate using an appropriate communications medium, such as computer-to-computer communications and/or the telephone. An optimal communications medium may vary depending on the type of featured item to be offered for sale. For example, it may be easier to negotiate reservation of a small number of extremely expensive products (e.g., limited edition collectibles) using the telephone, while it might be more convenient to reserve a large quantity of home appliance products using electronic communications that include information such as model numbers, product serial numbers, and other product data. Automated mechanisms for negotiating the quantity and time may also be used.

The supplier determines whether it can agree to the featured item quantity reservation and the reservation time period requested by the seller (step 405). Suppliers may consider a variety of factors in deciding whether to agree or not agree to the seller's quantity reservation request and/or reservation duration request. For example, the supplier may consider the price the seller offers to pay for the featured items. In some instances, the supplier may simply not have a large enough quantity of the featured item available. The supplier may also decide to balance the possibility of increased profits from a large group-buying sale against the risk of alienating other, perhaps long-time customers and against the risk of losing guaranteed sales to other customers while holding a possibly large portion of its inventory in reserve for the seller (who might not sell all of the inventory to buyers during the proposed on-line group-buying sale).

If the supplier does not agree to reserve the desired quantity of the featured items and/or for the desired time duration (step 405), then the seller and/or the supplier may attempt to determine if another quantity of featured item could be reserved by the seller and/or whether another time duration would be acceptable (step 407). Thus, the seller and the supplier may negotiate with each other to determine a negotiated feature item quantity and a negotiated feature item time reservation. Of course, the negotiations may involve the price that the seller will pay the supplier for the featured items. Automated mechanisms for negotiating the quantity and time may also be used.

Continuing the example above, suppose the supplier determines that it does not have the requested 450 widgets and that it could not obtain a significant number of additional widgets within the time-frame required by the seller. However, the supplier has 402 widgets in stock and proposes to the seller that 402 widgets be reserved for the group-buying sale. The seller may agree to this quantity for the reason that 402 widgets could be sold in three group-buying sales as 134 units, an amount that for this given widget the seller finds insignificantly lower than the requested 150 units per sale. Conversely, suppose the supplier notices that its inventory contains 460 widgets, and the supplier further determines that retaining an additional 10 widgets in inventory (after reserving 450 for the seller) would not be justified economically. Thus, the supplier may propose to the seller that the seller reserve all 460 units. The seller may agree to this proposal since it represents slightly more than three additional widgets per sale.

The negotiations and discussions between the supplier and the seller may require several iterations before featured item quantities and a featured item time reservation are agreed upon between the seller and the supplier. However, in the end, the supplier and seller may find that they can reach an agreement. If another quantity and/or time reservation are ultimately not possible (step 407), then the seller ends its efforts to source a supply of a featured item for an on-line group-buying sale, at least with respect to this supplier.

Once the seller and supplier have found an agreed upon quantity and time duration (e.g., a negotiated featured item quantity and a negotiated featured item time reservation), either via step 405 and/or step 407, the seller and supplier next enter into a binding agreement regarding the reservation of a particular featured item quantity for a particular length of time (step 409). While the agreement may take a variety of forms, the agreement preferably provides assurances to the seller that the supplier actually has the agreed upon featured item quantity and that the supplier will retain (e.g., reserve) the featured item quantity for the duration of the seller's on-line group-buying sale. While other clauses are possible, an exemplary clause that may be contained in an Agreement between the seller and the supplier is as follows:

> COMMITMENT LETTERS. From time to time, Seller and Supplier may agree that Supplier will reserve certain specified Merchandise (e.g., featured items) in its inventory for the benefit of Seller to permit the prospective sale of that Merchandise by Seller within a specified time period. Seller may memorialize such agreements by sending Supplier a written commitment letter ("Commitment Letter"). Unless Supplier notifies Seller otherwise in writing within 24 hours of receipt of a Commitment Letter, Seller may market and make commitments to sell such Merchandise in reliance on Supplier's commitment to supply such Merchandise in the quantities and on the terms set forth in such Commitment Letter. Seller shall not be bound to make any purchase of Merchandise based on a Commitment Letter until Seller has ordered such Merchandise in a written Purchase Order. Except as ordered in a written Purchase Order, projections, past purchasing history, and representations about quantities to be purchased are not binding on Seller and Seller shall not be liable for any act or expenditure (including expenditures for materials or packaging) by Supplier in reliance on them, unless Seller has agreed to a minimum quantity in a written Commitment Letter.

In an alternative embodiment, the seller may provide the supplier with some form of consideration, such as a deposit, as a mechanism for reaching agreement regarding the featured item quantity reservation. For example, a reservation payment of some sort may be necessary when the featured item to be reserved is extremely sought after in the marketplace, e.g., a particular children's toy during the Christmas holidays.

Once the agreement has been completed, the seller may set the quantity for sale in the on-line group-buying sale to equal the quantity reserved. Thus, the seller has attained an inventory for the featured item from the supplier, and the seller need not retain the featured item (e.g., product/service) in its own inventory before conducting an on-line group-buying sale on the featured item.

The seller then conducts at least one on-line group-buying sale of the featured items that have been reserved with the supplier (step 411). The seller may use any group-buying sale procedure; however, as previously discussed, the PowerBuy is the preferred group-buying sale procedure. If the seller conducts more than one group-buying sale, then any unused quantity from a prior sale may be applied to a later sale. Thus, in the example provided above, the seller may plan to sell the quantity of widgets in three sales of 150 widgets each, but may actually conduct three group-buying sales comprised of 150 offered widgets, 155 offered widgets (5 additional widgets added from the first sale that were not sold), and 160 offered widgets (10 additional widgets added from the second sale that were not sold).

Once the group-buying sale has been completed, then the seller contacts the supplier to inform the supplier of the quantity sold and to release the quantity not sold (step 413). The seller does not typically have to pay the supplier for unsold featured items. In some embodiments, the seller may also pay the supplier for the quantity sold during this step, while in other embodiments, payment may be provided within some future time period, such as 60 days. Of course, the seller may pay the supplier for the quantity sold at any time, although payment of the supplier at the time of providing the quantity sold may be preferable to the supplier and more convenient for the seller in some embodiments of the invention. Continuing with the example above, the seller may sell 446 units in one or more on-line group-buying sales conducted during the agreed upon time period. Accordingly, the seller notifies the supplier that 446 units have been sold, with the four remaining units released automatically. The seller may notify the supplier of the units sold via a purchase order in some embodiments of the invention, or may use automated or manual electronic communications.

The supplier and seller then follow agreed upon procedures for shipping the featured items sold to the buyers (customers) who purchased the featured items during the group-buying sale (step 415). For example, if the supplier is a distributor, then the supplier will be likely to ship the featured items directly to the customers. On the other hand, if the supplier is also the manufacturer of the featured items, then the supplier may be more likely to ship the featured items to a distributor who will package and label the featured items, as appropriate, for shipment to the customers. Of course, the seller may provide the delivery information to the supplier at other periods, such as at the end of each on-line group-buying sale conducted during the reservation period, e.g., a list of 145 buyers from a first sale, a list of 145 buyers from a second sale, and a list of 156 buyers from a third sale.

As previously discussed, the group product sourcing procedure may offer benefits to sellers, buyers, and suppliers. In a conventional warehouse environment, the sellers typically send suppliers orders for processing and shipment one at a time. For example, the supplier may receive an order to ship one clock radio to a buyer in the morning and then receive two orders to ship the same type of clock radio to another buyer in the afternoon. The supplier typically retrieves the units for shipment from its warehouse. This may entail having a worker on a forklift retrieve the unit and then deliver it to another facility for packaging and shipment. In other instances, this may entail having a robotic device, such as a robotic arm, retrieve the unit and process it for shipment. The conventional procedure provides the supplier with limited opportunities for achieving economies of scale in the retrieval of items for shipment to buyers.

In contrast, embodiments of the present invention may allow suppliers to achieve economies of scale in the retrieval and shipment of featured items. Suppose that an on-line group-buying sale results in the sale of 460 clock radios. The supplier may simply have one worker retrieve all 460 clock radios in one trip to that portion of its warehouse where such items are retained rather than 460 individual trips. Thus, the amount of items that the worker may retrieve are limited only by the worker's associated carrying capacity, e.g., the worker's forklift may only be able carry a limited number of clock radios. In some instances, the supplier's actual costs in retrieving and processing a large number of featured items may be only slightly higher than retrieving and processing a single item.

Other potential advantages for suppliers may include reduced insurance costs on a per item basis due to a higher turnover rate from on-line group-buying sales, e.g., sale of 460 featured items during a five-day reservation period in contrast to sale of the 460 items over a longer time period. Likewise, the supplier may enjoy a shorter average warehouse time per product due to sales during on-line group-buying sale reservation periods.

Figure 5:
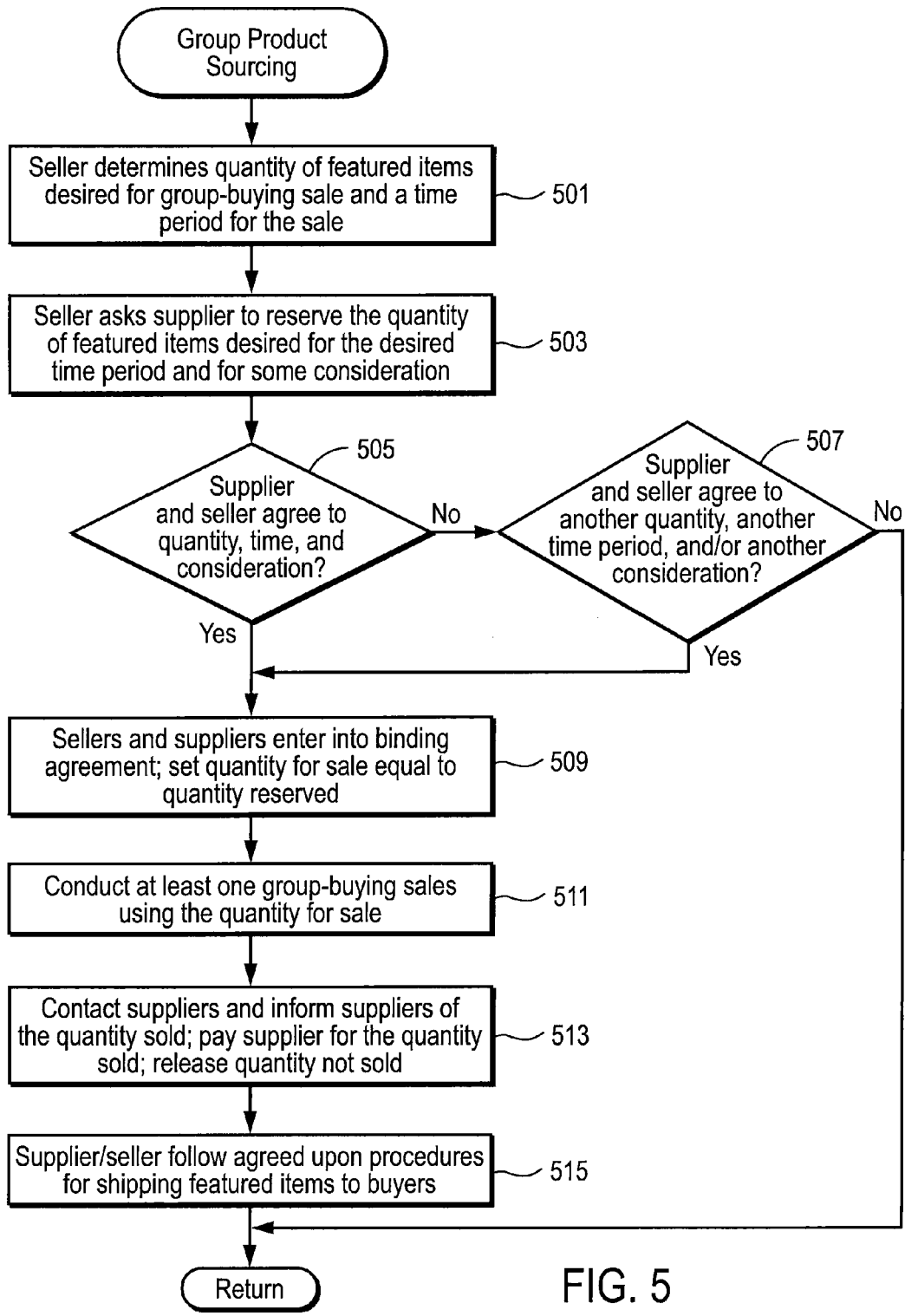
FIG. 5 is a flowchart describing a sample group sourcing procedure, according to an alternate embodiment of the invention.

FIG. 5 is a flowchart describing a group product sourcing procedure, according to an alternate embodiment of the invention.

A seller determines the quantity of a featured item for an on-line group-buying sale and a time duration for the sale (step 501). For example, the seller may determine that it will conduct three separate group-buying sales over a five-day period and that each individual group-buying sale will comprise 150 widgets, for a total of 450 widgets (3×150).

The seller asks a supplier to reserve the quantity of featured items desired, for the desired time period, and for particular consideration (step 503). In this alternative embodiment, the seller (and/or supplier) also proposes some form of consideration for obtaining the supplier's assent to the agreement. For example, the seller and supplier may agree to a specific money deposit and/or the seller's agreement to use the supplier for one or more future group-buying sales and/or a deposit (refundable or non-refundable).

Of course, the supplier decides whether it will agree to the featured item reservation request from the seller (step 505). As an ordinary artisan will recognize, suppliers may consider a variety of factors in deciding whether to agree or not agree to the seller's featured item quantity reservation request.

If the supplier does not agree to reserve the desired quantity of the featured item, or time duration, and/or consideration (step 505), then the seller and/or the supplier may negotiate to determine if they can agree upon another set of acceptable terms (step 507). Of course, the negotiations and discussions between the supplier and the seller may involve several iterations and involve numerous considerations before an agreement can be achieved. However, in the end, the supplier and seller may find that they can reach an agreement regarding a desired quantity of featured items. If the supplier and seller cannot reach agreement (step 507), then the seller ends its attempts to obtain a source of featured items for an on-line group-buying sale, at least with respect to this supplier. On the other hand, if alternative terms can be agreed upon (step 507), then the seller and supplier proceed to entering into a binding agreement (step 509).

Once the seller and supplier have found mutually agreed upon terms, either via step 505 and/or step 507, the seller and supplier enter into a binding agreement regarding the reservation of a particular featured item quantity (step 509). The agreement may take a variety of forms. As discussed earlier, Table 1 provides but one exemplary clause that may be contained in a contract between sellers and suppliers. The seller may set the quantity for sale in the group-buying sale equal to the quantity reserved. Thus, the seller has attained a product inventory grouping for the featured item from the supplier, and the seller need not retain the featured item (e.g., product/service) in its own inventory before conducting an on-line group-buying sale on the featured item.

The seller then conducts at least one group-buying sale using the quantity for sale that has been reserved with the supplier (step 511). The seller may use any group-buying sale procedure, although the PowerBuy group-sales procedure is preferred.

Once the group-buying sale has been completed, the seller contacts the supplier to inform the supplier of the quantity sold and to release the quantity not sold (step 513). The seller does not typically have to pay the supplier for the unsold featured items, aside from any consideration that may have been paid to reserve the quantity of featured items. As previously discussed, the seller may also pay the supplier for the quantity sold at this time or at another agreed-upon time.

The supplier and seller then follow agreed upon procedures for shipping the featured items sold to the buyers (customers) who purchased the featured items during the group-buying sale (step 515). For example, if the supplier is a distributor, then the supplier will be likely to ship the featured items directly to the customers. On the other hand, if the supplier is also the manufacturer of the featured items, then the supplier may be more likely to ship the featured items to a distributor who will package the featured items, as appropriate, for shipment to the customers.

Figure 6:
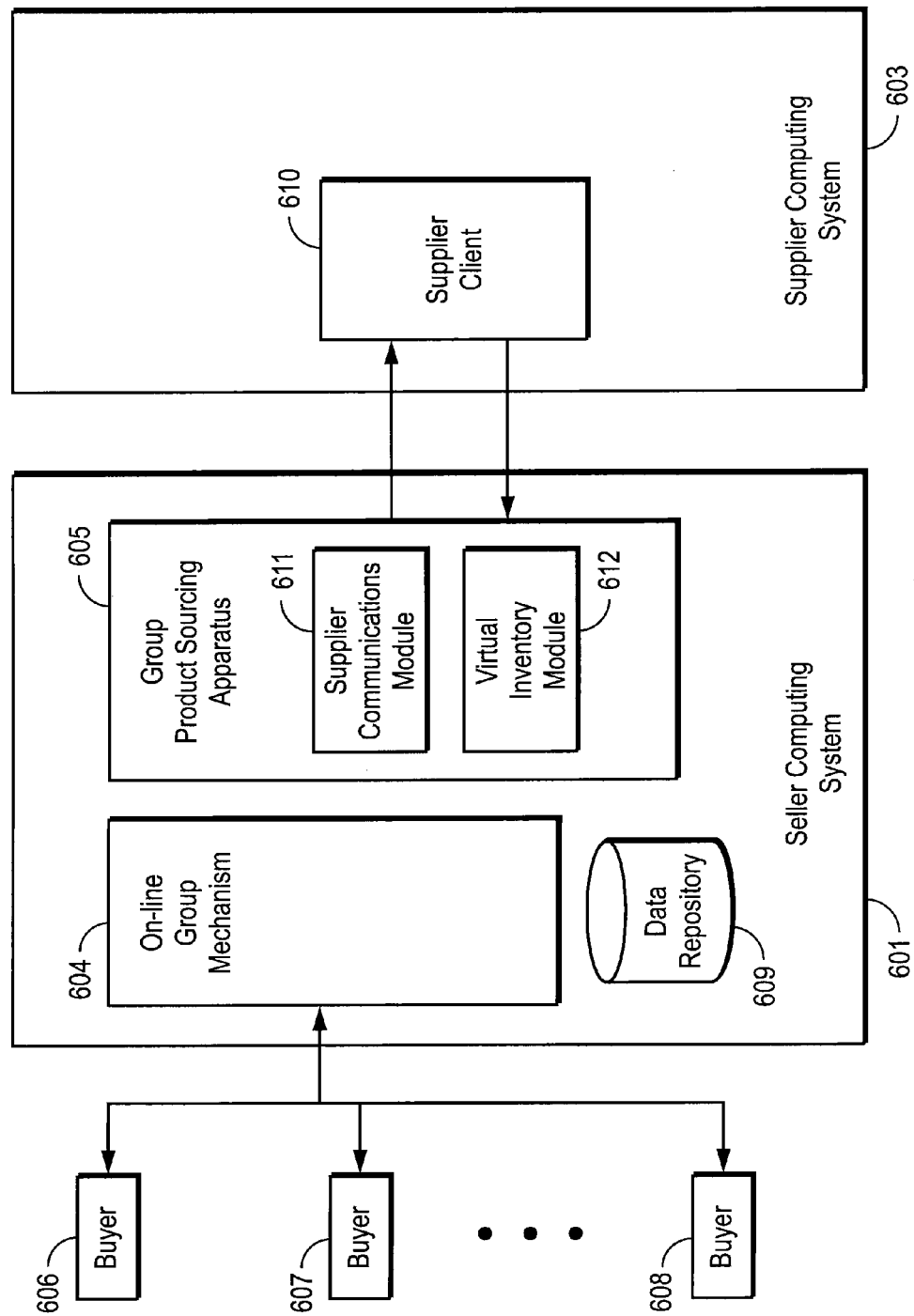
FIG. 6 is a block diagram of a seller computing system having a group product sourcing apparatus configured to support a group product source procedure, according to an embodiment of the invention.

FIG. 6 is a block diagram of a seller computing system 601 having a group product sourcing apparatus 605 configured to support a group product sourcing procedure, according to an embodiment of the invention. The seller computing system 601 may also include an on-line group-buying mechanism 604 that supports the seller's on-line group-buying sales. Of course, in other embodiments, the seller may locate the on-line group-buying mechanism 604 on another computing system, and in still other embodiments, the on-line group-buying mechanism 604 (or a portion of it) may be associated with a partner's computing system. The seller computing system 601 may be any sort of computing system capable of supporting the volume of transactions anticipated by the seller; e.g., the volume of communications expected between the seller computing system 601 and buyers 606-608. If the seller only plans to offer a few featured items for sale in an on-line group-buying sale, then a rather simple computing system may be sufficient. On the other hand, if the seller plans to offer hundreds of featured items for sale in an on-line group-buying sale, then a more sophisticated computing apparatus may be more appropriate.

The seller may use the group product sourcing apparatus 605 to prepare and send data regarding proposed group sourcing initiatives to a supplier computing system 603. As previously discussed, in some embodiments of the invention, the seller and supplier may also communicate using a medium such as the telephone. In other embodiments, such as the one shown in FIG. 6, the seller and supplier may communicate via mediums such as electronic mail ("e-mail") and/or and electronic data interchange ("EDI"). In such embodiments, the seller, via the seller computing system 601, and the supplier, via the supplier computing system 603, may communicate with each other and engage in the negotiations associated with group product sourcing procedures, such as those described in FIGS. 4 and 5. In particular, the group product sourcing apparatus 605 may include a supplier communications module 611 and a virtual inventory module 612. The supplier communications module 611 may be configured to support one or more communications media, such as e-mail, EDI, and/or voice communications, with the supplier computing system 603. The supplier communications module 611 may also be configured to assist the seller in proposing featured item quantity requests and featured item time reservation requests for transmission to the supplier. The supplier communications module 611 may access seller data in a data repository 609, such as data regarding previous on-line group-buying sales that may be helpful to the seller in preparing a proposal to the supplier. The virtual inventory module 612 may further assist the seller in negotiations with the supplier. The virtual inventory module 612, as well as the supplier communications module 611, may also be used to retrieve contract data (e.g., the Agreement shown in Table 1) for transmission to the supplier and may include functionality configured to insert data pertaining to particular group product sourcing proposals, such as insertion of the supplier name, the negotiated featured item quantity, and the negotiated featured item time reservation. The virtual inventory module 612 may also store electronic versions of executed agreements received from the supplier in the data repository 609. The virtual inventory module 612 may be configured to store the negotiated featured item quantity and the negotiated featured item time reservation data in the data repository 609 once the seller and supplier have agreed upon such terms. The on-line group-buying sale mechanism 604 may be configured to access this data for use in one or more on-line group-buying sales.

Like the seller computing system 601, the supplier computing system 603 may be any sort of computing system, from a personal computer to a workstation to an extremely powerful computing system. The supplier computing system 603 may include a supplier client 610 configured to receive and transmit communications to the seller computing system 601. Of course, the supplier client 610 need not necessarily comprise a specialized computing element developed exclusively for communications with the seller, and in some embodiments may comprise a conventional apparatus such as an electronic mail system. A specialized supplier client 610 may provide a better interface with the group product sourcing apparatus 605, which may further facilitate communications between the seller and the supplier.

Once the seller and the supplier have completed arrangements for group product sourcing for a featured item, then the seller may use the on-line group-buying mechanism 604 to conduct one or more on-line group-buying sales of the featured item with the buyers 606-608. The supplier communications module 611 may be configured to send shipment instructions to the supplier regarding the number of featured items sold during the on-line group-buying sale.

The seller computing system 601 and the supplier computing system 603 may be arranged differently than indicated in FIG. 6, provided that the resulting arrangement can support the group product sourcing procedures described herein.

Embodiments of the invention may further include a help system, including a wizard that directs a seller and/or supplier through the steps of completing a featured item quantity reservation or completing the closing transactions with the supplier following the end of an on-line group-buying sale.

Software implementing the group product sourcing procedure may be written for operation with any computer operating system and for operation in any computing environment. In addition, any such software may be designed using CORBA, ACTIVEX® controls, JavaScript, and/or Java applets. According to one embodiment of the invention, Java applets may provide a plug-in group product sourcing procedure module for use with another application on both a single computer and in a networked embodiment.

The group product sourcing procedure may be built using an object-oriented programming methodology or using any other programming methodology that results in a computing system having appropriate functionality. The invention has been discussed in terms of computer programs but is equally applicable for systems utilizing hardware that performs similar functions, such as application specific integrated circuits ("ASICs").

These and other changes can be made to the invention in light of the above detailed description. In general, in the following claims, the terms used should not be construed to limit the invention to the specific embodiments disclosed in the specification and the claims, but should be construed to include all systems and methods that operate under the claims set forth hereinbelow. Accordingly, the invention is not limited by the disclosure.

What is claimed is:

1. A method for sourcing a featured item for an on-line group-buying sale, comprising:
 communicating to a supplier a featured item quantity and a featured item time reservation;
 receiving the supplier's consent to reserve the featured item quantity for the negotiated featured item time reservation for sale in the on-line group-buying sale;
 conducting an on-line group-buying sale for the featured item during the featured item time reservation, selling at least a portion of the featured item quantity to one or more buyers; and
 supplying the featured items sold in the on-line group-buying sale to one or more buyers by instructing the supplier to provide the items to one or more buyers.

2. The method of claim 1, further comprising:
 executing a binding agreement with the supplier regarding the featured item quantity and the featured item time reservation, wherein the binding agreement requires the supplier to retain the featured item quantity for the featured item time reservation.

3. The method of claim 2, further comprising:
 providing the supplier with consideration in exchange for the supplier's execution of the binding agreement.

4. The method of claim 3 wherein the consideration is at least one of a reserve price, an agreement to reserve another featured item, and a deposit.

5. The method of claim 1, further comprising:
communicating to the supplier payment terms regarding the featured item to be sold during the on-line group-buying sale before conducting the on-line group-buying sale; and
paying the supplier for a number of featured items sold during the on-line group-buying sale.

6. The method of claim 1 wherein the featured item is sold in the on-line group-buying sale at the same price to all buyers of the featured item.

7. A method for sourcing a featured item for an on-line group-buying sale, comprising:
receiving from a seller a featured item quantity and a featured item time reservation;
negotiating with the seller to determine a featured item quantity and a featured item time reservation;
executing a binding agreement with the seller regarding the featured item quantity and the featured item time reservation, wherein the binding agreement requires the seller to reserve the featured item quantity for the featured item time reservation for sale in the on-line group buying sale;
receiving a confirmation of the sale of a featured item in an on-line group-buying sale; and
supplying a featured item sold during the on-line group-buying sale responsive to instructions from the seller.

8. The method of claim 7, further comprising:
retrieving the number of featured items sold during the on-line group-buying sale from a warehouse; and
packaging the number of featured items sold during the on-line group-buying sale for shipment to buyers.

9. The method of claim 7, further comprising:
receiving consideration from the seller in exchange for executing the binding agreement.

10. The method of claim 9 wherein the consideration comprises at least one of a reserve price, an agreement to reserve another featured item, and a deposit.

11. The method of claim 7, further comprising:
communicating to the seller payment terms regarding the featured items to be sold during the on-line group-buying sale.

12. The method of claim 7 wherein the featured item is sold in the on-line group-buying sale at the same price to all buyers of the featured item.

13. A method for sourcing an item for an on-line group-buying sale, the method comprising:
reserving a specified quantity of the item for a specified period of time for sale in the on-line group-buying sale with a supplier of the item;
selling a plurality of the items during the specified period of time to a plurality of buyers in the on-line group-buying sale; and
supplying the items bought by buyers in the on-line group-buying sale to the buyers by instructing the supplier to provide the featured items to the buyers.

14. The method of claim 13 wherein the featured item is sold in the on-line group-buying sale at the same price to all buyers of the featured item.

15. The method of claim 13 wherein reserving a specified quantity of the item during a specified period of time further comprises forming an agreement with the supplier in which consideration is provided to the supplier in exchange for the supplier's commitment to reserve the specified quantity of the item during the specified period time.

16. The method of claim 13 further comprising reserving the specified quantity of the item at a specified price.

17. The method of claim 13 further comprising the step of using a computer-implemented system to reserve the specified quantity of the item during the specified period of time with the supplier.

18. The method of claim 17 further comprising the step of using the computer-implemented system to compensate the supplier for the items supplied by the supplier to buyers in the on-line group-buying sale.

19. The method of claim 13 further comprising the step of forming an option contract with a supplier of the item, the option for the seller to purchase the specified quantity of the item for the specified period of time and expiring after an option period.

20. The method of claim 19, further comprising wherein the featured item is sold in the on-line group-buying sale at the same price to all buyers of the featured item.

21. A method of doing business, comprising:
forming an option contract between a supplier of an item and a seller of the item, the
option for the seller to purchase a quantity of the items and expiring after an option period; and
forming a group sale of the item between the seller and a plurality of buyers during the option period wherein all of the buyers pay the same price for the items, wherein the seller provides to the supplier delivery instructions for delivering the items directly from the supplier to the buyers.

22. The method of claim 21, wherein the group sale comprises an on-line group-buying sale.

23. A method of selling quantities of an item, the method comprising:
forming an option contract to obtain an option to purchase a quantity of an item during an option period;
receiving, during the option period, individual offers from buyers each for an individual quantity of the item at an individual unit price;
aggregating individual offers from the buyers to form an aggregated offer having an aggregated quantity of the individual quantities of the offers;
responsive to an aggregated offer for a quantity of the item above a starting quantity, lowering the unit price of the item below a starting unit price; and
accepting a final aggregated offer for a final quantity of the item at a final unit price, wherein accepting the final aggregated offer automatically executes contracts to sell the item to all the buyers whose offers are reflected in the final aggregated offer, wherein the contracts with the buyers are at the same final unit price and are for the individual quantities requested in the buyers' individual offers.

24. The method of claim 23 further comprising the steps of:
receiving individual offers from buyers in an on-line group buying sale; and
accepting a final aggregated offer for a final quantity of the item, thereby consummating an on-line group buying sale.

25. The method of claim 23 further comprising the step of using a computer-implemented system to execute contracts to sell the item to all the buyers whose offers are reflected in the final aggregated offer.

26. A combination of contractual relations, comprising:
an option contract between a seller and a supplier granting the seller a right to purchase a reserved quantity of items from the supplier during an option period; and
a plurality of individual sales contracts between the seller and a plurality of respective, individual buyers, each contract for the sale of a portion of the reserved quantity of the items, wherein the plurality of sales contracts result from an on-line group-buying sale from the seller to the buyers, all of the individual sale contracts at the same unit price, the unit price determined based on the aggregate quantity of items sold in the plurality of sales contracts.

* * * * *

UNITED STATES PATENT AND TRADEMARK OFFICE
CERTIFICATE OF CORRECTION

PATENT NO. : 7,263,498 B1
APPLICATION NO. : 09/863801
DATED : August 28, 2007
INVENTOR(S) : Van Horn et al.

Page 1 of 1

It is certified that error appears in the above-identified patent and that said Letters Patent is hereby corrected as shown below:

Title Page, item (56), under "Other Publications", in Column 2, Line 1, delete "Contacts" and insert -- Contracts --.

Title Page 2, item (56), under "Other Publications", in Column 1, Line 1, delete "Contacts" and insert -- Contracts --.

Title Page 2, item (56), under "Other Publications", in Column 2, Line 2, delete "Applicationto" and insert -- Application to --.

Title Page 2, item (56), under "Other Publications", in Column 2, Line 20, delete "Loyality" and insert -- Loyalty --.

Title Page 2, item (56), under "Other Publications", in Column 2, Line 24, delete "//savvio.com" and insert -- //www.savvio.com --.

Title Page 2, item (56), under "Other Publications", in Column 2, Line 29, delete "p. 119NY9M057," and insert -- p. 119NYM057, --.

Title Page 2, item (56), under "Other Publications", in Column 2, Line 39, delete "Cat #CH36351," and insert -- Cat. #99CH36351, --.

Title Page 2, item (56), under "Other Publications", in Column 2, Line 46, delete "www.agoricscom" and insert -- www.agorics.com --.

Column 15, line 22, in Claim 7, delete "group buying" and insert -- group-buying --.

Column 15, line 65, in Claim 15, delete "specified period time." and insert -- specified period of time. --.

Column 16, line 53, in Claim 24, delete "group buying" and insert -- group-buying --.

Column 16, lines 55-56, in Claim 24, delete "group buying" and insert -- group-buying --.

Signed and Sealed this
Nineteenth Day of June, 2012

David J. Kappos
*Director of the United States Patent and Trademark Office*